United States Patent
Dworak et al.

(10) Patent No.: US 12,325,200 B2
(45) Date of Patent: Jun. 10, 2025

(54) METHOD OF REPAIRING DAMAGE TO A THERMOPLASTIC COMPOSITE ELEMENT

(71) Applicant: POLSKIE ZAKLADY LOTNICZE SPOLKA Z OGRANICZONA ODPOWIEDZIALNOSCIA, Mielec (PL)

(72) Inventors: Adam Dworak, Baranow Sandomierski (PL); Aleksander Banas, Rzeszow (PL); Janusz Madry, Mielec (PL); Jaroslaw Sienicki, Mielec (PL); Marcin Glodzik, Mielec (PL)

(73) Assignee: POLSKIE ZAKLADY LOTNICZE SPOLKA Z ORGRANICZONA ODPOWIEDZIALNOSCIA, Mielec (PL)

( * ) Notice: Subject to any disclaimer, the term of this patent is extended or adjusted under 35 U.S.C. 154(b) by 0 days.

(21) Appl. No.: 18/001,989

(22) PCT Filed: Apr. 15, 2021

(86) PCT No.: PCT/IB2021/053099
§ 371 (c)(1),
(2) Date: Dec. 15, 2022

(87) PCT Pub. No.: WO2021/260447
PCT Pub. Date: Dec. 30, 2021

(65) Prior Publication Data
US 2023/0347603 A1    Nov. 2, 2023

(30) Foreign Application Priority Data
Jun. 22, 2020 (PL) .......................... 434397

(51) Int. Cl.
*B29C 73/10* (2006.01)
*B29C 37/00* (2006.01)
(Continued)

(52) U.S. Cl.
CPC .......... *B29C 73/10* (2013.01); *B29C 37/0075* (2013.01); *B29C 2073/268* (2013.01);
(Continued)

(58) Field of Classification Search
CPC .......................... B29C 73/10; B29C 37/0075
See application file for complete search history.

(56) References Cited

U.S. PATENT DOCUMENTS 9,545,782 B2    1/2017  Shome et al.
2019/0310081 A1 * 10/2019 Cenac ................. G01M 5/0091

FOREIGN PATENT DOCUMENTS

WO    WO-2017081456 A1 *  5/2017

OTHER PUBLICATIONS

International Search Report, Application No. PCT/IB2021/053099, Mailed Jun. 23, 2021, 5 pages.
(Continued)

*Primary Examiner* — Nahida Sultana
*Assistant Examiner* — Virak Nguon
(74) *Attorney, Agent, or Firm* — Ziegler IP Law Group LLC.

(57) ABSTRACT

The disclosed embodiments relate to a method for repairing a damage to a thermoplastic composite element, in particular an aircraft component, wherein a socket is milled at the site of damage to the thermoplastic composite element. Then, in the socket a patch is formed from a thermosetting material containing a reinforcing phase of fabric layers and a matrix of thermosetting resin, the patch having a shape and size corresponding to the socket geometry. In the next step, the patch is cured, and finally the cured patch is glued into the socket by means of an adhesive.

9 Claims, 1 Drawing Sheet

(51) Int. Cl.
  *B29C 73/26*      (2006.01)
  *B29K 63/00*      (2006.01)
  *B29K 71/00*      (2006.01)
  *B29K 105/12*     (2006.01)
  *B29K 307/04*     (2006.01)
  *B29L 31/30*      (2006.01)
(52) U.S. Cl.
  CPC ...... *B29K 2063/00* (2013.01); *B29K 2071/00* (2013.01); *B29K 2105/12* (2013.01); *B29K 2307/04* (2013.01); *B29L 2031/3076* (2013.01)

(56) References Cited

OTHER PUBLICATIONS

Written Opinion of the International Searching Authority, Application No. PCT/IB2021/053099, Mailed Jun. 23, 2021, 8 pages.

\* cited by examiner

METHOD OF REPAIRING DAMAGE TO A THERMOPLASTIC COMPOSITE ELEMENT

FIELD

The aspects of the disclosed embodiments relate to a method of repairing damage to a thermoplastic composite element, in particular an aircraft element damaged during operation.

PRIOR ART

One of the problems associated with operation of elements made of thermoplastic composites is the occurrence of damage caused by a hit of an external object or cracks resulting from the intense structural movement of the composite structure. Repair of damaged structures made of welding, mechanical or energy-assisted. In these cases, a repair consists in welding together fragments of damaged thermoplastic composite element.

In the currently used methods of welding together elements made of thermoplastic composites, and thus also repairing damaged elements made of these composites, the plasticization effect of a polymer matrix of the thermoplastic composite when subjected to high temperatures is used; however, this requires heating the edges of the damaged element to be heated to temperatures close to the melting point of the matrix polymer. In the case of polymers with a high melting point, such as polyetheretherketone (PEEK), it is necessary to supply large amounts of heat to ensure the temperature in the welding zone even above 340° C., which is not possible under all conditions.

On the other hand, in methods using other ways of local heating of the welded fragments of a damaged thermoplastic element, such as ultrasonic, induction or electrofusion methods, it is necessary to use equipment on both sides of the surface of the repaired element, which is not always possible in case of hard-to-reach sites. Moreover, repairing damaged structures with a clearly marked curvature requires the use of a repair element with an accurately reproduced curvature. This necessitates the manufacture of dedicated tooling for forming the repair element.

SUMMARY

The aim of the present disclosure was to provide a method of repairing damage to a thermoplastic composite element devoid of the above-discussed disadvantages of known solutions, and in particular a method allowing to repair damaged elements of a thermoplastic structure with variable geometry without the need to adjust the tooling used each time, as well as to eliminate the need to use special tooling for molding thermoplastic composites and the need to supply large amounts of heat to the area to be repaired, even in case of thermoplastic composites with a matrix of high melting polymers, such as e.g. PEEK.

The subject of the disclosed embodiments is a method of repairing damage to a thermoplastic composite element, in particular an aircraft element, wherein a socket is milled at the site of damage to the thermoplastic composite element. Next, a patch of thermosetting material comprising a reinforcement phase of fabric layers and a matrix of thermosetting resin is formed in this socket, said patch having a shape and size corresponding to the socket geometry. In the next step of the method, the patch is cured and finally the cured patch is glued into the socket by means of an adhesive.

Preferably, the socket is milled layer-wise to form a stepped structure on the damaged surface of the thermoplastic composite element.

Preferably, in the step of forming the patch in the socket, the following are placed sequentially:
- a separating layer in form of a film or a separating agent;
- sections of the fabric layers constituting the reinforcing phase of the thermosetting material, impregnated with a matrix of thermosetting resin, whereby the number of fabric layers, their total thickness as well as the shape and size of individual sections corresponds to the geometry of the socket;

and then such prepared patch is covered successively with: a perforated separating foil, an absorbing fabric, a separating foil, a heating blanket, a breathable fabric and a vacuum foil, and the entire repair package thus formed is sealed to the surface of the thermoplastic composite component being repaired by means of a sealing tape, preferably a butyl tape.

Preferably, once the repair pack is attached to the surface of the thermoplastic composite element to be repaired, air is pumped out of the repair pack.

Preferably, the patch of thermosetting material is cured using a heating blanket provided with an external portable power supply and control device.

Preferably, the adhesive is a thermosetting adhesive, but it is also possible to use other adhesives applied as a thin layer and curable as a result of a chemical reaction, e.g. between the components of a two-component adhesive.

In the embodiment using the thermosetting adhesive as an adhesive, preferably in the step of gluing the cured patch into the socket, the adhesive layer is applied to the contact surface of the socket and the cured patch, next the cured patch is pressed into the socket, and then on the cured patch placed in the socket the following elements are placed sequentially: the perforated separating foil, the absorbing fabric, the separating film, the heating blanket, the breathable fabric and the vacuum foil, and afterwards the entire vacuum package thus formed is sealed to the surface of the thermoplastic composite element to be repaired by means of the sealing tape, preferably a butyl tape, air is pumped out of the package and the adhesive layer is cured using a heating blanket provided with the external portable power supply and control device.

Preferably, in the thermoplastic composite the matrix is polyetheretherketone (PEEK) and the reinforcing phase is carbon fiber.

Preferably, carbon fiber fabric layers are used as the reinforcing phase of the thermosetting material.

Preferably, an epoxy resin is used as the matrix of the thermosetting material.

The method according to the disclosed embodiments allows for the repair of damages to a thermoplastic composite element that can be implemented in hangar conditions, without the need to use complicated and expensive equipment, without the need to supply large amounts of heat to the repaired area, and at the same time maintaining a high quality of the repaired damage, guaranteeing its sufficient strength mechanical.

BRIEF DESCRIPTION OF FIGURES

The method according to the present disclosure in an embodiment is illustrated in the drawing, in which.

DETAILED DESCRIPTION

In the exemplary embodiment of the method according to the disclosed embodiments, the damaged element to be repaired is made of a thermoplastic composite, in which the matrix is polyetheretherketone (PEEK) and the reinforcing phase is carbon fiber.

After identifying the damage in the first repair step, a socket 14 is milled at the site of the damage to the thermoplastic composite element 10, the milling being performed layer-wise to form a stepped structure on the surface of the damage to the thermoplastic composite element 10. Thus, the original irregular shape of the identified damage (e.g. a crack, a cavity) is replaced with a milled socket with the so-called stepped gradation, formed by removing the thermoplastic composite layer-wise from the damaged area, starting from the deepest point of the damage to the surface of the repaired element, the area of each successively removed layer being larger than the previous one.

Figure 1:
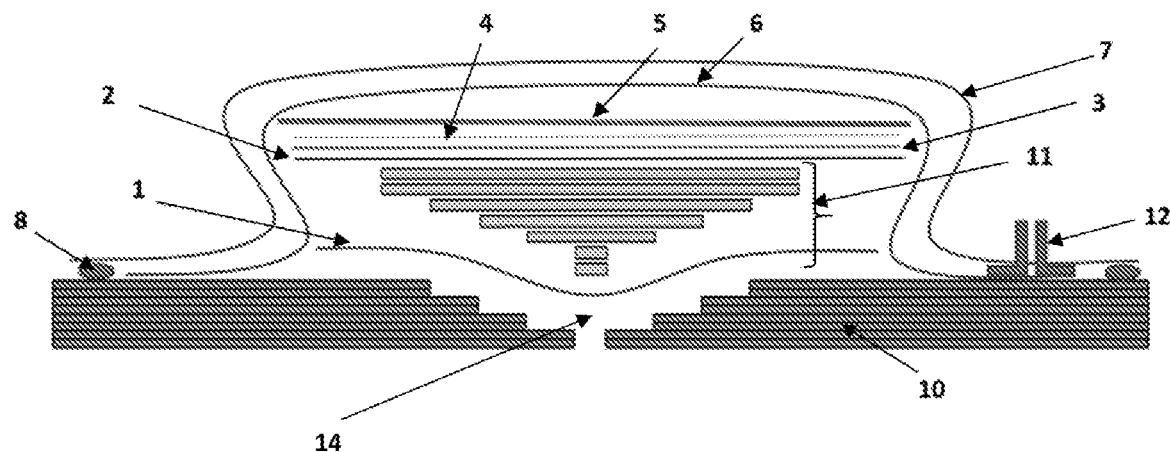
FIG. 1 shows the step of curing a patch of thermosetting material in a socket milled in a damaged thermoplastic composite element.
Figure 2:
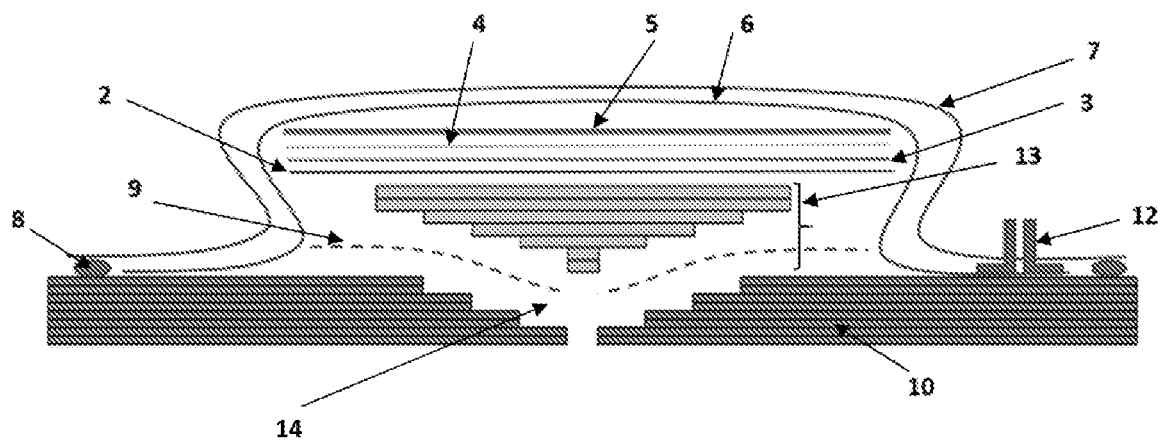
FIG. 2 shows the step of gluing the cured patch of the thermoset composite into the socket milled in the damaged thermoplastic composite element.

Thereafter, a repair patch is formed in the socket 14, said patch being made of a thermosetting material containing a reinforcement phase of fabric layers and a matrix of a thermosetting resin. In the exemplary embodiment, the reinforcing phase of the thermosetting material is made of carbon fiber fabric layers 11, and the matrix is epoxy resin. As shown in FIG. 1, in the patch formation step, the socket 14 is lined with a separating layer 1, which in the exemplary embodiment is Tooltec® A007 foil from Airtech [polyethylene terephthalate (PTFE) foil tape reinforced with glass fiber and provided with a layer of silicone adhesive]. Then, sections of the fabric layers 11 constituting the reinforcing phase of the thermosetting material impregnated with a matrix of thermosetting resin are placed in the socket 14, whereby the number of fabric layers 11, their total thickness, as well as the shape and size of individual sections correspond to the geometry of the milled socket 14. Such prepared patch is covered successively with: a perforated separating foil 2 (which in the exemplary embodiment is RF-2500-RED-30-1370-NP-NP-FNS foil), an absorbing fabric 3 [which in the exemplary embodiment is Econostitch® delaminating polyamide fabric from Airtech], a separating foil 4 [which in the exemplary embodiment is RF-2500-RED-30-1370-PIN-P3-FNS foil], a heating blanket 5 [which in the exemplary embodiment is a heating blanket with a Leslie portable power supply and control device], a breathable fabric 6 [which in the exemplary embodiment is the medium weight polyester mat Econoweaver® 44 from Airtech] and a vacuum foil 7 [which in the exemplary embodiment is Wrightlon® 5400 polyamide film from Airtech]. The entire repair package thus formed is sealed to the surface of the thermoplastic composite component 10 being repaired by means of a sealing tape 8, which in the exemplary embodiment is a butyl tape. Afterwards air is pumped out of the attached and sealed repair pack, and the patch is then cured using a heating blanket 5 provided with an external portable power supply and control device 12. In other words, the patch curing takes place in the socket 14 lined with a separating layer 1, so that the cured patch 13 has a shape that accurately reflects the geometry of the socket 14 milled in the repaired element and completely fills the socket. The cured patch 13 thus prepared is glued into the socket 14 by means of an adhesive 9, which in the exemplary embodiment is a thermosetting adhesive, such as LOCTITE EA 9323 two-component epoxy adhesive paste from Henkel. In this step a layer of thermosetting adhesive is applied to the contact surface of the socket 14 and the cured patch 13, and then the cured patch 13 is pressed into the socket 14. Afterwards the following elements are placed sequentially on the cured patch (13) placed in the socket (14): the perforated separating film 2, the absorbing fabric 3, the separating foil 4, the heating blanket 5, the breathable fabric 6 and the vacuum foil 7. The entire vacuum packet thus formed is sealed to the surface of the repaired thermoplastic composite element 10 by means of a sealing tape 8, which in the exemplary embodiment is a butyl tape. Air is pumped out of the packet and the thermosetting adhesive layer is cured using the heating blanket 5 provided with the external portable power supply and control device 12. The permanently glued cured patch 13 prevents further damage propagation.

LIST OF REFERENCES IN DRAWINGS 1 separating layer
2 perforated separating foil
3 absorbing fabric
4 separating foil
5 heating blanket
6 breathable fabric
7 vacuum foil
8 sealing tape
9 adhesive
10 thermoplastic composite element
11 sections of fabric layers
12 external portable power supply and control device
13 cured patch
14 socket

The invention claimed is:

1. A method of repairing damage to a thermoplastic composite element, comprising milling a socket at a site of damage to the thermoplastic composite element, then in said socket, forming a patch from a thermosetting material containing a reinforcing phase of fabric layers and a matrix of thermosetting resin, said patch having a shape and a size corresponding to a socket geometry, curing the patch and finally gluing the cured patch into the socket by means of an adhesive, wherein in the step of forming the patch in the socket, the following are placed sequentially:
   a separating layer in a form of a film or a separating agent;
   sections of fabric layers constituting the reinforcing phase of fabric layers of the thermosetting material, impregnated with a matrix of thermosetting resin, whereby a number of the sections of fabric layers, their total thickness as well as a shape and size of individual sections corresponds to the geometry of the socket; and
   then covering the prepared patch successively with: a perforated separating foil, an absorbing fabric, a separating foil, a heating blanket, a breathable fabric and a vacuum foil, and an entire repair package thus formed is sealed to a surface of the thermoplastic composite element being repaired by a sealing tape.

2. The method according to claim 1, wherein the socket is milled layer-wise to form a stepped structure at the site of damage the thermoplastic composite element.

3. The method according to claim 1, wherein once the repair package is attached to the surface of the thermoplastic composite element to be repaired, air is pumped out of the repair package.

4. The method according to claim 1, wherein the patch of thermosetting material is cured using the heating blanket provided with an external portable power supply and a control device.

5. The method according to claim 1, wherein the adhesive is a thermosetting adhesive.

6. The method according to claim 5, wherein in the step of gluing the cured patch into the socket, the adhesive layer is applied to a contact surface of the socket and the cured patch, next the cured patch is pressed into the socket, and then on the cured patch placed in the socket the following elements are placed sequentially: the perforated separating foil, the absorbing fabric, the separating film, the heating blanket, the breathable fabric and the vacuum foil, and afterwards an entire vacuum package thus formed is sealed to the surface of the thermoplastic composite element to be repaired by the sealing tape, air is pumped out of the vacuum package and the adhesive is cured using the heating blanket provided with an external portable power supply and a control device.

7. The method according to claim 1, wherein in the thermosetting material the matrix is polyetheretherketone (PEEK) and the reinforcing phase is carbon fiber.

8. The method according to claim 1, wherein carbon fiber fabric layers are used as the reinforcing phase of the thermosetting material.

9. The method according to claim 1, wherein an epoxy resin is used as the matrix of the thermosetting material.

* * * * *